Oct. 12, 1926.

H. E. BOYRIE

FLUID SEPARATOR

Filed July 24, 1925    2 Sheets-Sheet 1

1,602,641

INVENTOR.
Harry E. Boyrie

BY

ATTORNEY.

Oct. 12, 1926.
H. E. BOYRIE
1,602,641
FLUID SEPARATOR
Filed July 24, 1925  2 Sheets-Sheet 2
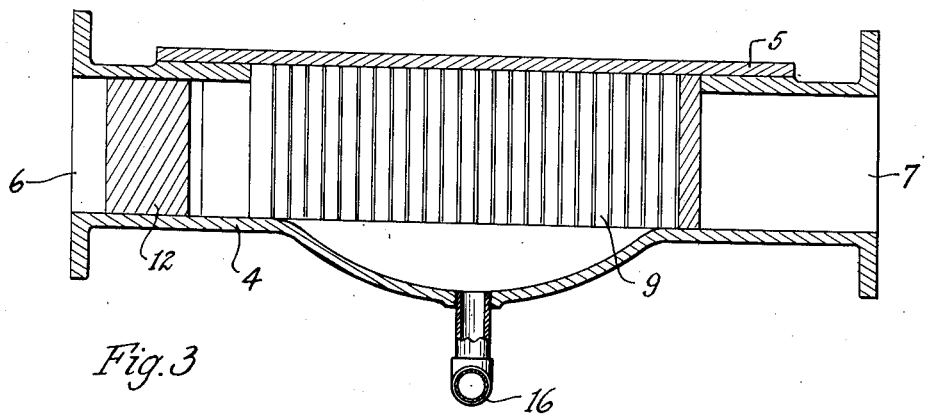
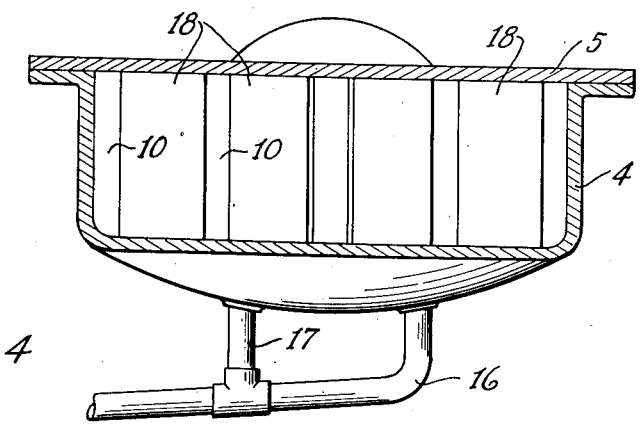
INVENTOR:
Harry E. Boyrie
BY
ATTORNEY.

Patented Oct. 12, 1926.

1,602,641

UNITED STATES PATENT OFFICE.

HARRY E. BOYRIE, OF SAN FRANCISCO, CALIFORNIA.

FLUID SEPARATOR.

Application filed July 24, 1925. Serial No. 45,780.

This invention relates to fluid separators to be used for separating liquids from gases or vapors when crude liquids are being separated into liquids of various densities, such as the production of gasoline by fractional distillation or otherwise. The separator which I have invented applies also to the separation of water from steam, and liquids from various other gases, and at the same time it purifies the gases, removing therefrom any solid substances that may be contained in the liquids or the gases. A particular object of the invention is to provide apparatus for such purposes which is so constructed as to have a large capacity for a relatively small space, making it particularly desirable for use in exterior piping systems, whereby the vapor is dried and purified independently of the boiler or the still or other gas generator that may be used. At the same time the separator may be installed in gas generators, even though there is but little space allowable for such purposes, as is the case with locomotive boilers and other gas generators.

Although the separator is applicable to these various purposes, yet for convenience and clearness in illustrating and describing the invention I have described it as applying to the purifying of steam, and as inserted in the steam piping system outside of the boiler and also in the steam drum of the boiler.

Figure 1:
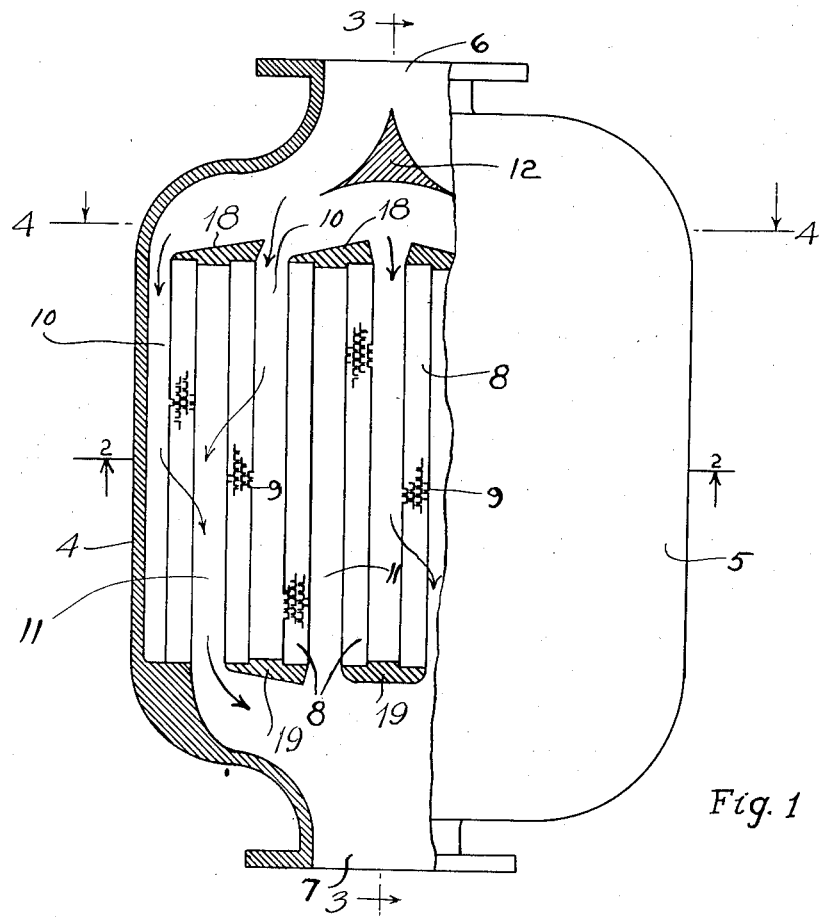
Figure 2:
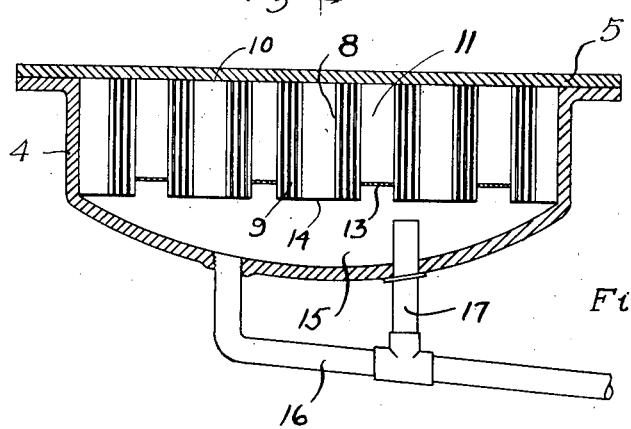

Of the accompanying drawings Fig. 1 is a sectional plan view of a separator which embodies the features of my invention; Fig. 2 is a sectional elevation of the separator along the line 2—2 of Fig. 1; and Figs. 3 and 4 are sectional elevations along the respective lines 3—3 and 4—4 of Fig. 1.

The separator in this instance is adapted for use in piping systems through which the gas or vapor is passing from the generator, such as a steam boiler, to the apparatus such as the turbines where the steam is to be used. Irrespective of the kind of boiler, or the means which may be used therein for purifying the steam, the steam is passed through the separator illustrated, and is dried and purified therein. The separator comprises a casing 4 which may be of any convenient shape. For convenience it is desirable to have a removable cover 5 which hermetically seals the casing by means of gaskets or otherwise. The cover can be removed in order to install or clean the purifying apparatus. The casing has a vapor inlet 6 and a vapor outlet 7, and within the casing, between the inlet and the outlet, are installed the drying and purifying elements. These comprise a series of frames or cartons 8 of baffles. These baffles may be of any suitable form. I prefer, however, trough-shaped baffles 9, vertically mounted in rows with the baffles in each row staggered with reference to those in the adjacent rows, as indicated, it being understood that the frames are all filled with these baffles. As many baffles as may be desired may be used, but for ordinary purposes I prefer four rows.

Although I have herein referred to frames of baffles and baffles mounted in frames, yet it is to be understood that any suitable arrangement of rows or banks of baffles is intended. So far as my invention is concerned it is immaterial how the rows of baffles are held together whether in frames or merely by bolts or electric welding or in any other manner.

The frames of baffles are mounted in pairs with their inlets facing and extending downwardly from the plate 6, and are so positioned that passageways 10 are formed on each side of each pair so that the vapor can enter the passage-ways 10 and pass along the entire side of the frames and pass through the baffles to the inner passageways 11, thus passing from the inlet to the outlet through some of the frames of baffles as indicated by the arrows. I prefer to have each of the outer frames of baffles spaced from and with its inlet forming the adjacent wall of the casing 4, and thus forming a passageway between the frames and the wall, the inlet to the passageway being adjacent the inlet to the casing, and the other end of the passageway being closed. But if desired this arrangement may be reversed so that the outlet of the baffles face the wall. A deflector 12 is provided for more evenly distributing the vapor to the various passageways so as to fairly uniformly distribute the vapor throughout all portions of the various cartons. Plates 18 close one end of the passageways 11 and plates 19 close the other end of the passageways 10. After passing through the baffles the purified vapor passes out of the outlet 7.

Drain plates 13 are provided in the lower portions of the passageways 11 and other plates 14 are provided in the lower portions of the passageways 10 so that the vapor in passing through the baffles and while in the passageway 11 is separated from the liquid which drains downwardly along the walls of the baffles and passes into the chamber 15.

From this chamber 15 the liquid passes through a drain pipe 16 into a steam trap or other suitable liquid receiving apparatus. A vent pipe 17 is provided for allowing any gas or vapor which is in the drain pipe or receiving apparatus to pass back into the chamber 15, thus preventing undesirable back pressure in the drain pipe and giving greater capacity to the pipe.

It will be seen that I have provided what may be called a self-contained vapor drier and purifier, as the entire apparatus is used only for such purposes and may be installed in any suitable portion of the piping system, providing only that the vapor to be purified is passed through the separator. Also it will be seen that a separator of large capacity relative to its size is provided, as all of the space within the casing is utilized for this purpose.

I claim as my invention:

1. A fluid separator comprising a casing having a fluid inlet and a fluid outlet, said casing having a liquid chamber in the lower portion thereof and a gas chamber in the upper portion thereof, and a series of elongated frames of baffles mounted in said gas chamber, each of said frames having gas inlets on one side and gas outlets on the other side, and being arranged in pairs with passageways between each two adjacent frames, the frames of each pair facing each other, and the passageway between the frames of each pair having a gas outlet connecting with the outlet of said container.

2. A fluid separator comprising a casing, a plurality of elongated frames mounted in said casing, gas purifying baffles mounted in said frames, each of said frames having gas inlets on one side and outlets on the other side, one set of alternate frames having their inlets all on corresponding sides, and on the side opposite to the inlets of the remaining frames.

3. A fluid separator comprising a casing, a plurality of elongated frames mounted in said casing, gas purifying baffles mounted in said frames, each of said frames having gas inlets on one side and outlets on the other side, one set of alternate frames having their inlets all on the same side, and on the side opposite to the inlets of the remaining frames, said frames and casing forming gas passageways between the said frames, the alternate passageways all having gas inlets at the corresponding ends of the frames, and the remaining passageways having gas outlets adjacent the other ends of the frames.

4. A fluid separator comprising a casing having a fluid inlet, a fluid outlet, and a liquid outlet in its lower portion, a plurality of rows of purifying baffles mounted in said casing and extending from adjacent the fluid inlet to adjacent the fluid outlet, said rows being spaced apart, means for closing at one end of the rows of baffles the alternate spaces between the rows, and means for closing at the other ends of the rows the other spaces between the rows.

5. A fluid separator comprising a casing having a fluid inlet, a fluid outlet, and a liquid outlet in its lower portion, a plurality of rows of purifying baffles mounted in said casing and extending from adjacent the fluid inlet to adjacent the fluid outlet, said rows being spaced apart, means for closing at one end of the rows of baffles the alternate spaces between the rows, and means for closing at the other ends of the rows the other spaces between the rows, the baffles extending upwardly to the walls of said casing and means for closing the spaces adjacent the lower edges of the rows of baffles.

6. A fluid separator comprising a casing having a gas inlet and a gas outlet, frames of baffles mounted in said casing between said inlet and outlet, passageways being formed between the walls of said casing and the adjacent frames, each of the frames having a gas inlet on one side and a gas outlet on the other side, the inlet of each frame facing an inlet of an adjacent frame.

7. A fluid separator comprising a casing having an inlet and an outlet, frames of baffles mounted in said casing, each of said frames having inlets on one side and outlets on the other side, said frames being spaced apart with their inlets and outlets facing, respectively, the inlets and outlets of the adjacent frames, the spaces between the inlet sides of adjacent frames being connected with the inlet of said casing, and the spaces between the outlet sides of adjacent frames being connected with the outlet of said casing.

8. A fluid separator comprising a casing having an outlet, frames of baffles mounted in substantially the same plane in said casing, each of said frames having inlets on one side and outlets on the other side, each of said frames having its inlet side facing the inlet side of an adjacent frame and its outlet side facing the outlet side of the other adjacent baffle, means closing one end of each of the spaces between the facing inlets, the other end of the spaces opening into the inlet of said casing.

9. A fluid separator comprising a casing having an outlet, frames of baffles mounted in substantially the same plane in said casing, each of said frames having inlets on one side and outlets on the other side, each of said frames having its inlet side facing the inlet side of an adjacent frame and its outlet side facing the outlet side of the other adjacent baffle, means closing one end of each of the spaces between the facing inlets, the other end of the spaces opening into the inlet of said casing, and means closing the one end of each of the spaces between the facing outlets, the other end of the spaces opening into the outlet of said casing.

10. A fluid separator, comprising a casing having a fluid inlet, a fluid outlet, and a liquid outlet at the lower side, a plurality of rows of baffles extending from adjacent said inlet to adjacent the fluid outlet, the inlet and the outlet sides of the baffles of one row facing the respective inlet and outlet sides of the opposite adjacent rows, the rows of baffles being substantially parallel and being spaced apart, means for closing the spaces between the outlet sides of the rows at the ends of the rows adjacent the fluid inlet of the casing, and means for closing the spaces between the inlet sides of the rows at the ends adjacent the fluid outlet of the casing.

11. A fluid separator, comprising a casing having a fluid inlet, a fluid outlet, and a liquid outlet at the lower side, a plurality of rows of baffles extending from adjacent said inlet to adjacent the fluid outlet, the inlet and the outlet sides of the baffles of one row facing the respective inlet and outlet sides of the opposite adjacent rows, the rows of baffles being spaced apart, means for closing the spaces between the outlet sides of the rows at the ends of the rows adjacent the fluid inlet of the casing, and means for closing the spaces between the inlet sides of the rows at the ends adjacent the fluid outlet of the casing, and means for closing the edges of the spaces adjacent the upper and lower edges of the rows of baffles.

12. A fluid separator comprising a fluid inlet and a fluid outlet, a plurality of rows of baffles spaced apart, the baffle inlets and outlet of one row facing the respective baffle inlets and outlets of the adjacent opposite rows, the said fluid inlet communicating with the spaces between the inlet sides of the baffles at one end of two adjacent rows, and the fluid outlet communicating with the spaces between the outlet sides of the baffles at the other end of two adjacent rows.

13. A fluid separator comprising a fluid inlet and a fluid outlet, a plurality of rows of baffles spaced apart, the baffle inlets and outlets of one row facing the respective baffle inlets and outlets of the adjacent opposite rows, the said fluid inlet communicating with the spaces between the two inlet sides of the baffles at one end of two adjacent rows, and the fluid outlet communicating with the spaces between the two outlet sides of the baffles at the other end of the said two adjacent rows, the rows of baffles being substantially parallel.

14. A fluid separator comprising a casing having a fluid inlet and a fluid outlet, a plurality of rows of baffles spaced apart, the baffle inlets and outlets of the inner rows facing the respective baffle inlets and outlets of the adjacent opposite rows, the said fluid inlet communicating with the spaces between the two inlet sides of the baffles at one end of two adjacent rows, and the fluid outlet communicating with the spaces between the two outlet sides of the baffles at the other end of the said two adjacent rows, each of the outer rows of baffles having its inlet facing and spaced from the adjacent wall of the casing, the space between the wall and the outer frame communicating with the fluid inlet and the other end of the space being closed.

In testimony whereof, I hereunto set my hand.

HARRY E. BOYRIE.